United States Patent [19]

Lavallee

[11] Patent Number: 4,670,523
[45] Date of Patent: Jun. 2, 1987

[54] TITANIUM CHELATE MODIFIED NYLON MAGNET WIRE INSULATION COATING

[75] Inventor: Francois A. Lavallee, Fort Wayne, Ind.

[73] Assignee: Essex Group, Inc., Fort Wayne, Ind.

[21] Appl. No.: 757,110

[22] Filed: Jul. 19, 1985

Related U.S. Application Data

[62] Division of Ser. No. 732,763, May 10, 1985, Pat. No. 4,563,369.

[51] Int. Cl.$^4$ .................. C08F 283/04; C08K 5/11
[52] U.S. Cl. .................................... 525/420; 524/204; 524/301; 524/315; 524/316; 524/336; 524/398
[58] Field of Search ............... 525/420; 524/398, 204, 524/336, 301, 315, 316

[56] References Cited

U.S. PATENT DOCUMENTS 4,487,883 12/1984 Homan .............................. 525/420

Primary Examiner—John C. Bleutge
Assistant Examiner—A. L. Cappillo
Attorney, Agent, or Firm—Harry J. Gwinnell

[57] ABSTRACT

A magnet wire enamel having improved runnability and insulating properties is described comprising nylon containing 0.25% to 20% by weight titanium chelate. The nylon can be a sole coat, outermost coating, or bond coat.

2 Claims, No Drawings

TITANIUM CHELATE MODIFIED NYLON MAGNET WIRE INSULATION COATING

This is a division of copending application Ser. No. 732,763 filed on May 10, 1985, now U.S. Pat. No. 4,563,369.

TECHNICAL FIELD

The field of art to which this invention pertains is polyamide coating compositions, and particularly nylon coating compositions on insulated magnet wire substrates.

BACKGROUND ART

Because of their relative low cost and the desirable handling properties they provide to polymer insulated magnet wire, nylon topcoats have been used in the magnet wire area for several years. However, such coatings are not without problems. For example, on high temperature wire such as magnet wire coated with polyester base coats, nylon overcoats have suffered from such things as ring cracks (circular cracks perpendicular to the major axis of the coated wire) particularly in dry weather and such cracks can cause catastrophic wire failure. Furthermore, because of the relatively low solidification point of nylon, temperature changes can cause great difficulty in providing a smooth coating on wire. Part of this problem results from the fact that when applying plural coatings of the nylon, successive coats redissolve previously applied coats, thus producing smoothness problems.

Accordingly, what is needed in this art is a nylon composition which overcomes such problems.

DISCLOSURE OF INVENTION

The present invention is directed to an improved magnet wire enamel composition comprising nylon modified by reaction with a titanium chelate. The titanium chelate reacts with the amine and carboxyl groups on the nylon molecule resulting in a nylon modified dimer with both improved application to magnet wire substrates and improved wire properties after application to the magnet wire substrates. The titanium chelates are typically reacted into the nylon in an amount of about 0.25% to about 10% by weight of the nylon present in the enamel composition.

Another aspect of the invention is electrically insulated magnet wire containing a plurality of polymer layers of insulation where at least one of the layers comprises the above-described nylon enamel.

Another aspect of the invention comprises a method of forming polymer insulated magnet wire having a plurality of polymeric insulating layers where at least one of the layers is the nylon material described above.

These and other advantages of the present invention will become more apparent from the following description.

BEST MODE FOR CARRYING OUT THE INVENTION

Any nylon material can be catalyzed with the tianate described herein. Typically nylon 6; nylon 11; nylon 6,6; nylon 6,12; etc. are used. The titanium chelates used are organic chelates, specifically alkyl chelates, and preferably titanium acetyl acetonate, titanium ethyl acetyl acetonate, titanium triethanolamine chelate, and the ammonium salt of titanium lactic acid chelate. Typically the nylon layer is used as an overcoat on such things as standard polyester (such as THEIC polyester), polyurethane or polyvinyl formal resins. However, it can also be used in conventional constructions as an intermediate layer (bond coat) between multiple layers of, e.g. polyurethane or as a sole coat.

Although not wishing to be bound by any particular theory it is believed that the titanium chelate nylon reaction occurs as follows:

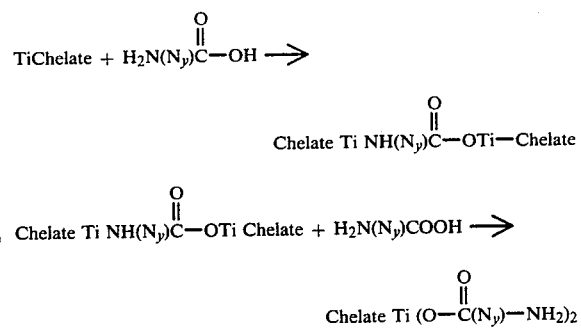

where

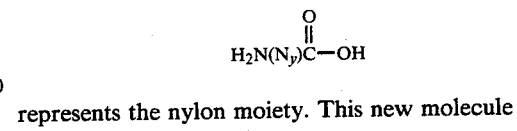

represents the nylon moiety. This new molecule

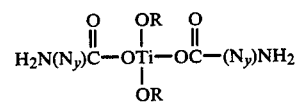

(where R is an alkyl group stemming from the chelate) is very stable because bonding two carboxyl

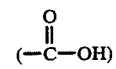

groups to a titanium center uses up all the coordination sites on the titanium.

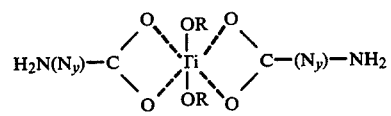

This molecule, which we will refer to as a nylon dimer, has a chemistry of its own when applied to the wire substrate. For example, when applied to a previously applied base coat such as an hydroxyl rich polyester as discussed above, the following reactions take place:

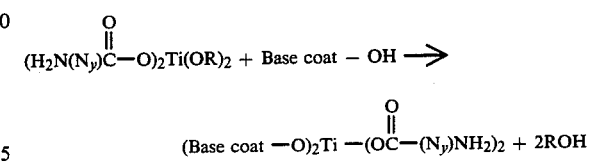

The base coat surface is hydroxyl rich and can react with one or two of the remaining alkoxy groups on the titanium nylon dimer. The above equation is writen for the reaction of two alkoxy groups.

In a sole nylon coat or in the body of the film which does not interact with other layers the following reaction takes place:

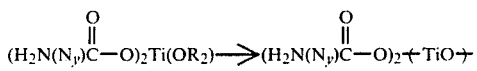

where the O on the Ti reacts with available

While the polymers according to the present invention can be used on any electrical conductor they are preferably used on wires and specifically on magnet wires. The wires are generally copper or aluminum and range anywhere from 4 AWG to 42 AWG (American Wire Gauge) in diameter, with 18 AWG being the most commonly coated wire. Wire coatings can be anywhere from 0.1 to 5 mils or any thickness desired and preferably about 3.2 mils on 18 AWG wire. As stated above the coatings can be used as part of a multicoat system in combination with conventional polymer insulation such as polyesters, polyurethanes, polylvinyl formal, polyimides, polyamideimides, etc. and combinations thereof. The polymer coatings can also contain lubricants either externally on the nylon or admixed with the nylon.

Typical multicoat systems include such things as THEIC polyester base coats with nylon topcoats with the nylon comprising about 20% to about 25% of the total thickness. When used as a bond coat, i.e. an intermediate layer between two additional layers of polymer insulation (such as a polyurethane base coat, the nylon bond coat, and a polyvinyl butyral topcoat, i.e. a solderable composition) the nylon typically represents about 5% to about 10% of the total wire product.

The enamels according to the present invention can be applied by any conventional means such as coating dyes, roller or felt application with viscosity adjustments made accordingly. Viscosity adjustments can be made by dilution with appropriate enamel solvents or diluents. Such solvents are typically cresylic acids, and methyl pyrrolidone, N,N-dimethyl or N,N-diethyl formamide and N,N-diethyl acetamide, along with any conventional hydrocarbon diluents such as xylene, Solvesso ™ 100 (Exxon) or D59 ™ hydrocarbon (Drake Petroleum Company).

Conventional ovens can be used to heat treat the magnet wire after application of the nylon. Typical inlet oven temperatures are of the order of 500° F. to 700° F., preferably about 580° F. and outlet oven temperatures of about 800° F. to 1100° F., and preferably about 900° F. are used for drying and curing.

In order to demonstrate the improved and unexpected properties of nylon modified with the titanium chelates according to the present invention, a series of experiments were run to ascertain the effects of various chelates on the enamel.

The following table shows the properties of wire made from reprocessed scrap nylon repelletized.

These enamels were tested on 18 AWG copper with THEIC polyester base coat in a Df (250° C.) as low as 0.03.

TABLE

| Additive | % Additive | Mandrel Pull | DF @ Heat 250° C. | Shock |
|---|---|---|---|---|
| Titanium Ethylacetoacetonate (Tyzon ® DC, DuPont Co.) | 1.6 | Pass | .65 | OK |
| Titanium Triethanolamine Chelate Solution (Tyzor TE) | 1.5 | Pass | .05 | |
| Titanium Lactic Acid Chelate Ammonium Salt (Tyzor LA) | 1.5 | Pass | .62 | OK |
| Titanium Acetylacetonate Solution (Tyzor AA) | .4 | Pass | .03 | OK |
| Titanium Acetylacetonate Solution | 1.0 | Pass | .03 | OK |
| Control (No Titanate) | 0.0 | Fail | .05 | OK |

The Tg and melt point of modified and unmodified nylons were compared and found not to have been changed by the dimerization. This absence of change was to be expected. Chelate treated nylon still passes the HCl acid blush test.

EXAMPLE

One part per hundred by weight of titanium acetyl acetonate was reacted with nylon made from reprocessed scrap nylon 6,6 fibers repellitized. A 15% by weight mixture of this modified nylon was made up with cresol, phenol, and/or xylene by mixing for one-half hour to form a homogeneous solution. This mixture was coated on 18 AWG wire as described above. The change in properties were as shown in the table below:

TABLE

| | Df (250° C.) | Mandrel Pull | Snap/Flex |
|---|---|---|---|
| Enamel Without Chelate | .03 | 1 | Pass |
| | .07 | 1 | Pass |
| | .12 | 14 | Pass |
| Same Enamel With 1% Titanium Acetyl Acetonate | .04 | 10+ | Pass |
| | .06 | 10 | Pass |
| | .11 | 10+ | Pass |

In this table Df (Dissipation Factor) values of between about 0.12 and about 0.28 represent a cured enamel with values less than about 0.11 representing overcure. In the mandrel pull column, values greater than about 10 represent a "pass".

As stated above besides providing improved sole coats and topcoats for various polymer constructions, the modified nylon according to the present invention also produces an improved intermediate layer (bond coat) in multiple layer constructions.

Although this invention has been shown and described with respect to detailed embodiments thereof, it will be understood by those skilled in the art that various changes in form and detail thereof may be made without departing from the spirit and scope of the claimed invention.

What is claimed is:

1. A magnet wire enamel composition consisting essentially of the reaction product obtained by heating a nylon with 0.25% to 20% by weight of a titanium chelate to a temperature between 800° F. and 1100° F., resulting in a magnet wire enamel having improved runability and electrical insulating properties.

2. The magnet wire enamel of claim 1 wherein the titanate is selected from the group consisting of titanium acetyl acetonate, titanium ethyl acetyl acetonate, titanium triethanolamine chelate, and the ammonium salt of titanium lactic acid chelate.

* * * * *